United States Patent
Lei et al.

(10) Patent No.: US 11,239,953 B2
(45) Date of Patent: Feb. 1, 2022

(54) TRIGGERING HARQ-ACK FEEDBACK FOR A DOWNLINK SLOT SET

(71) Applicant: Lenovo (Beijing) Limited, Beijing (CN)

(72) Inventors: Haipeng Lei, Beijing (CN); Haiming Wang, Beijing (CN)

(73) Assignee: Lenovo (Beijing) Co. LTD, Beijing (CN)

( * ) Notice: Subject to any disclaimer, the term of this patent is extended or adjusted under 35 U.S.C. 154(b) by 4 days.

(21) Appl. No.: 16/638,404

(22) PCT Filed: Aug. 11, 2017

(86) PCT No.: PCT/CN2017/097134
§ 371 (c)(1),
(2) Date: Feb. 11, 2020

(87) PCT Pub. No.: WO2019/028844
PCT Pub. Date: Feb. 14, 2019

(65) Prior Publication Data
US 2020/0366417 A1    Nov. 19, 2020

(51) Int. Cl.
*H04W 56/00* (2009.01)
*H04L 1/16* (2006.01)
*H04L 1/18* (2006.01)

(52) U.S. Cl.
CPC ........ *H04L 1/1685* (2013.01); *H04L 1/1854* (2013.01); *H04L 1/1896* (2013.01)

(58) Field of Classification Search
CPC ............... H04L 1/1685; H04L 1/1854; H04L 1/1896; H04L 2001/0092; H04L 5/001;
(Continued)

(56) References Cited

U.S. PATENT DOCUMENTS

| 10,271,288 | B2 * | 4/2019 | Pelletier | H04W 52/343 |
| 10,548,169 | B2 * | 1/2020 | Yang | H04W 76/27 |

(Continued)

FOREIGN PATENT DOCUMENTS

| EP | 3043502 A1 | 7/2016 |
| WO | 2010149069 A1 | 12/2010 |
| WO | 2016161629 | 10/2016 |

OTHER PUBLICATIONS

LG Electronics, 3GPP TSG RAN WG1 NR Ad-Hoc Meeting, R1-1700511, "Discussion on control signaling for HARQ in NR", dated Jan. 16-20, 2017, pp. 1-4.
(Continued)

*Primary Examiner* — Phuc H Tran
(74) *Attorney, Agent, or Firm* — Kunzler Bean & Adamson (57) ABSTRACT

Apparatuses, methods, and systems are disclosed for triggering HARQ-ACK feedback for a downlink slot set. One apparatus includes a receiver that receives a first control signal from a base unit for triggering HARQ-ACK feedback for a downlink slot set. The downlink slot set comprises multiple downlink slots. The apparatus includes a processor that identifies the downlink slot set in response to the first control signal and a transmitter that transmits UCI to the base unit in a slot determined by the first control signal. Here, the UCI comprises the HARQ-ACK feedback for the identified downlink slot set. The HARQ-ACK feedback for the downlink slot set corresponds to all downlink transmissions in the downlink slot set and is transmitted in one UCI.

18 Claims, 6 Drawing Sheets

(58) Field of Classification Search
CPC ....... H04L 5/0044; H04L 5/0057; H04L 5/14;
H04L 1/0013; H04L 1/1657; H04L 5/00;
H04L 5/0039; H04L 5/0091; H04L
5/0092; H04L 1/0003; H04L 1/0025;
H04L 1/0026
See application file for complete search history.

(56) References Cited

U.S. PATENT DOCUMENTS

| | | | | |
|---|---|---|---|---|
| 2017/0303284 | A1* | 10/2017 | Xu | H04L 1/0026 |
| 2018/0279167 | A1* | 9/2018 | Li | H04L 1/1822 |
| 2019/0174440 | A1* | 6/2019 | Kwak | H04W 56/001 |
| 2020/0177321 | A1* | 6/2020 | Shi | H04L 1/18 |
| 2020/0245257 | A1* | 7/2020 | Pelletier | H04W 52/365 |
| 2020/0374044 | A1* | 11/2020 | Lei | H04L 5/0007 |
| 2020/0374048 | A1* | 11/2020 | Lei | H04W 52/146 |

OTHER PUBLICATIONS

LG Electronics, 3GPP TSG RAN WG1 Meeting #88, R1-1702486, "Discussion on scheduling and HARQ feedback for NR", dated Feb. 13-17, 2017, pp. 1-8.
LG Electronics, 3GPP TSG RAN WG1 Meeting #88bis, R1-1704911, "Discussion on NR-PUCCH resource allocation", dated Apr. 3-7, 2017, pp. 1-6.
Samsung, 3GPP TSG RAN WG1 meeting #88bis, R1-1705400, "Slot Aggregation", dated Apr. 3-7, 2017, pp. 1-2.
LG Electronics, 3GPP TSG RAN WG1 Meeting #89, R1-1707657, "Consideration on aggregated HARQ-ACK feedback tor NR", dated May 15-19, 2017, pp. 1-4.
LG Electronics, 3GPP TSG RAN WG1 Meeting NR Ad-Hoc#2, R1-1710332, "Consideration on HARQ-ACK feedback timing for NR", dated Jun. 27-30, 2017, pp. 1-5.
LG Electronics, 3GPP TSG RAN WG1 Meeting NR Ad-Hoc#2, R1-1710333, "Support of HARQ-ACK multiplexing/bundling for NR", dated Jun. 27-30, 2017, pp. 1-7.
International Application No. PCT/CN2017/097134, "Notification of Transmittal of the International Search Report and the Written Opinion of the International Searching Authority", dated May 4, 2018, pp. 1-11.
Huawei, HiSilicon, 3GPP TSG RAN WG1 Meeting #89 R1-1708151, "Multiplexing of multiple HARQ-ACK feedback", dated May 15-19, 2017, pp. 1-3.
Nokia, Alcatel-Lucent Shanghai Bell, 3GPP TSG RAN WG1#89 R1-1708527, "On HARQ feedback determination", dated May 15-19, 2017, pp. 1-3.
Ericsson, GPP TSG-RAN WG1 #89 R1-1709101, "On HARQ Codebook", dated May 15-19, 2017, pp. 1-2.
Ericsson, 3GPP TSG-RAN WG1 Nr Ad-Hoc#2 R1-1711510, "On HARQ Codebook", dated Jun. 27-30, 2017, pp. 1-3.
3GPP, "3rd Generation Partnership Project; Technical Specification Group Radio Access Network; Evolved Universal Terrestrial Radio Access (E-UTRA); Physical layer procedures (Release 14)", 3GPP TS 36.213 V14.3.0, Jun. 2017, pp. 1-460.
ZTE, ATE Microlelectronics, "NR PUCCH resource allocation", 3GPP TSG RAN WG1 Meeting #88b R1-1704375, Apr. 3-7, 2017, pp. 1-9.

* cited by examiner

TRIGGERING HARQ-ACK FEEDBACK FOR A DOWNLINK SLOT SET

FIELD

The subject matter disclosed herein relates generally to wireless communications and more particularly relates to triggering HARQ-ACK feedback for a downlink slot set.

BACKGROUND

The following abbreviations are herewith defined, at least some of which are referred to within the following description.

Third Generation Partnership Project ("3GPP"), Positive-Acknowledgment ("ACK"), Access and Mobility Management Function ("AMF"), Binary Phase Shift Keying ("BPSK"), Carrier Aggregation ("CA"), Clear Channel Assessment ("CCA"), Control Channel Element ("CCE"), Cyclic Prefix ("CP"), Channel State Information ("CSI"), Common Search Space ("CSS"), Discrete Fourier Transform Spread ("DFTS"), Downlink Assignment Index ("DAP"), Downlink Control Information ("DCI"), Downlink ("DL"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MCS"), Multiple Input Multiple Output ("MIMO"), Multi User Shared Access ("MUSA"), Narrowband ("NB"), Negative-Acknowledgment ("NACK") or ("NAK"), New Data Indicator ("NDI"), Network Function ("NF"), Next Generation Node B ("gNB"), Non-Orthogonal Multiple Access ("NOMA"), Orthogonal Frequency Division Multiplexing ("OFDM"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Session Management Function ("SMF"), Sounding Reference Signal ("SRS"), Single Carrier Frequency Division Multiple Access ("SC-FDMA"), Shared Channel ("SCH"), Signal-to-Interference-Plus-Noise Ratio ("SINR"), System Frame Number ("SFN"), Semi-Persistent Scheduling ("SPS"), Transport Block ("TB"), Transport Block Size ("TBS"), Time-Division Duplex ("TDD"), Time Division Multiplex ("TDM"), Transmission and Reception Point ("TRP"), Transmission Time Interval ("TTI"), Transmit ("TX"), Uplink Control Information ("UCI"), User Entity/Equipment (Mobile Terminal) ("UE"), Uplink ("UL"), User Plane Function ("UPF"), Universal Mobile Telecommunications System ("UMTS"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In 5G networks, if the UE traffic is not latency sensitive, then the corresponding HARQ-ACK bits for multiple PDSCHs of the UE can be aggregated and transmitted in a single UL channel (e.g. PUCCH). If the latency requirement is satisfied, then aggregated HARQ-ACK feedback can work more efficiently for 5G networks due to reduced PUCCH resource usage. However, in 5G network there is no concrete downlink association set to indicate on which slots the UCI containing the aggregated HARQ-ACK should be transmitted.

BRIEF SUMMARY

Methods for triggering HARQ-ACK feedback for a downlink slot set are disclosed. Apparatuses and systems also perform the functions of the methods. The methods may also be embodied in one or more computer program products comprising executable code.

In one embodiment, a method for triggering HARQ-ACK feedback for a downlink slot set includes a remote unit (such as a UE) receiving a first control signal from a base unit for triggering hybrid automatic repeat request acknowledgement ("HARQ-ACK") feedback for a downlink slot set. Here, the downlink slot set includes multiple downlink slots. The HARQ-ACK feedback for the downlink slot set corresponds to all downlink transmissions in the downlink slot set and is transmitted in one uplink control information ("UCI"). The method includes identifying the downlink slot set in response to the first control signal and transmitting UCI to the base unit in a slot determined by the first control signal. Here, the UCI comprises the HARQ-ACK feedback for the identified downlink slot set.

Another method for triggering HARQ-ACK feedback for a downlink slot set includes a base unit (such as a gNB) transmitting a first control signal to a remote unit for triggering HARQ-ACK feedback for a downlink slot set. Here, the downlink slot set includes multiple downlink slots. The HARQ-ACK feedback for the downlink slot set corresponds to all downlink transmissions in the downlink slot set and is transmitted (by the remote unit) in one UCI. The method also includes receiving UCI from the remote unit in a slot determined by the first control signal, wherein the UCI comprises the HARQ-ACK feedback for the downlink slot set.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/ acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to indicate when a remote unit (e.g., a UE) is to send aggregated HARQ-ACK feedback to a base unit (e.g., a gNB), the remote unit may send UCI with the aggregated HARQ-ACK feedback in response to a control signal from the base unit. Here, the aggregated HARQ-ACK feedback may correspond to all downlink transmissions in a downlink slot set. The remote unit identifies the downlink slot set in response to receiving the control signal and transmit the aggregated HARQ-ACK feedback to the base unit. In certain embodiments, the control signal explicitly and/or implicitly indicates the size and slot location of the downlink slot set. Additionally, the control signal may indicate a slot on which the remote unit is to transmit the UCI.

Figure 1:
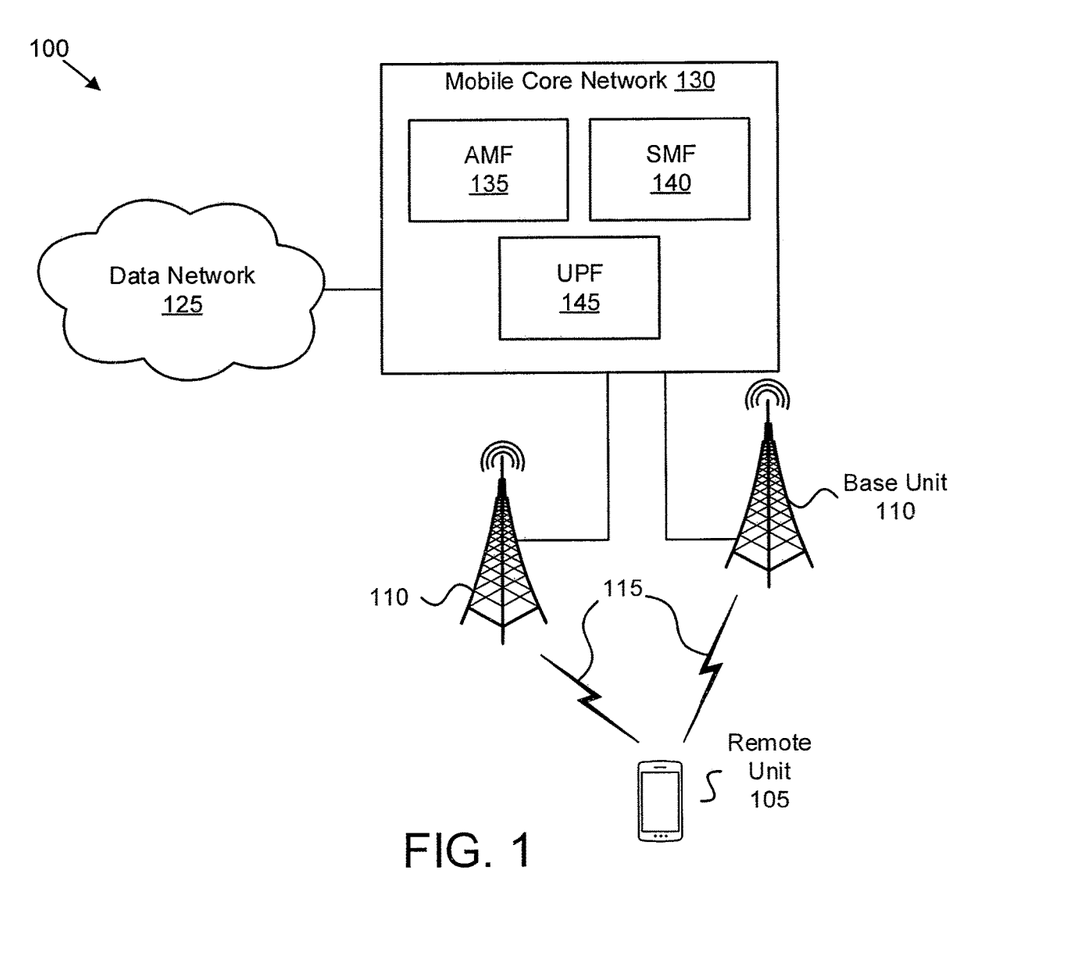
FIG. 1 is a schematic block diagram illustrating one embodiment of a wireless communication system for triggering HARQ-ACK feedback for a downlink slot set.

FIG. 1 depicts a wireless communication system 100 for triggering HARQ-ACK feedback for a downlink slot set, according to embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE-A or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, user equipment ("UE"), user terminals, a device, or by other terminology used in the art. The remote units 105 may communicate directly with one or more of the base units 110 via uplink ("UL") and downlink ("DL") communication signals, for example a remote unit 105 may send data in a transport block ("TB") to a base unit 110 via UL communication signals and receive data or control signals from the base unit via DL communication signals. Furthermore, the UL and DL communication signals may be carried over the communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN") that may include one or more controllers communicably coupled to one or more corresponding base units 110. The RAN is generally communicably coupled to one or more core networks, which in turn may be coupled to other networks, like the Internet and public switched telephone networks, among other networks. These and other elements of radio access and core networks are not illustrated but are well known generally by those having ordinary skill in the art. The base units 110 connect to the mobile core network 130 via the RAN.

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC") or the evolved packet core ("EPC"), which may be coupled to other data network 125, like the Internet and private data networks, among other data networks. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes an access and mobility management function ("AMF") 135, a session management function ("SMF") 140, and a user plane function ("UPF") 145. Although a specific number of AMFs 135, SMFs 140, and UPFs 145 are depicted in FIG. 1, one of skill in the art will recognize that any number of AMFs 135, SMFs 140, and UPFs 145 may be included in the mobile core network 130.

The AMF 135 provides services such as UE registration, UE connection management, and UE mobility management. The SMF 140 manages the data sessions of the remote units 105, such as a PDU session. The UPF 145 provides user plane (e.g., data) services to the remote units 105. A data connection between the remote unit 105 and a data network 125 is managed by a UPF 145.

As discussed in further detail below, a remote unit 105 may be configured to report HARQ-ACK feedback to a base unit 110 only in response to receiving a trigger from the base unit 110. For example, the remote unit 105 may receive a RRC signal to enter into a triggered-reporting mode. At some point after sending PDSCH transmissions (e.g., over a downlink slot set) to the remote unit 105, the base unit 110 transmits a control signal to the remote unit 105 to trigger HARQ-ACK feedback reporting for a downlink slot set. As the downlink slot set includes multiple downlink slots, the HARQ-ACK feedback for the downlink slot set corresponds to all downlink transmissions in the downlink slot set. Moreover, the remote unit 105 transmits the HARQ-ACK feedback in one UCI.

Upon receiving the control signal (for triggering HARQ-ACK feedback for a downlink slot set), the remote unit 105 identifies the downlink slot set. In certain embodiments, the control signal indicates a starting slot of the set, an ending slot of the set, and/or a size of the downlink slot set. The remote unit 105 also determines a slot for transmitting the UCI using the control signal and transmits the UCI containing the HARQ-ACK feedback for the identified downlink slot set in the determined slot.

Figure 2:
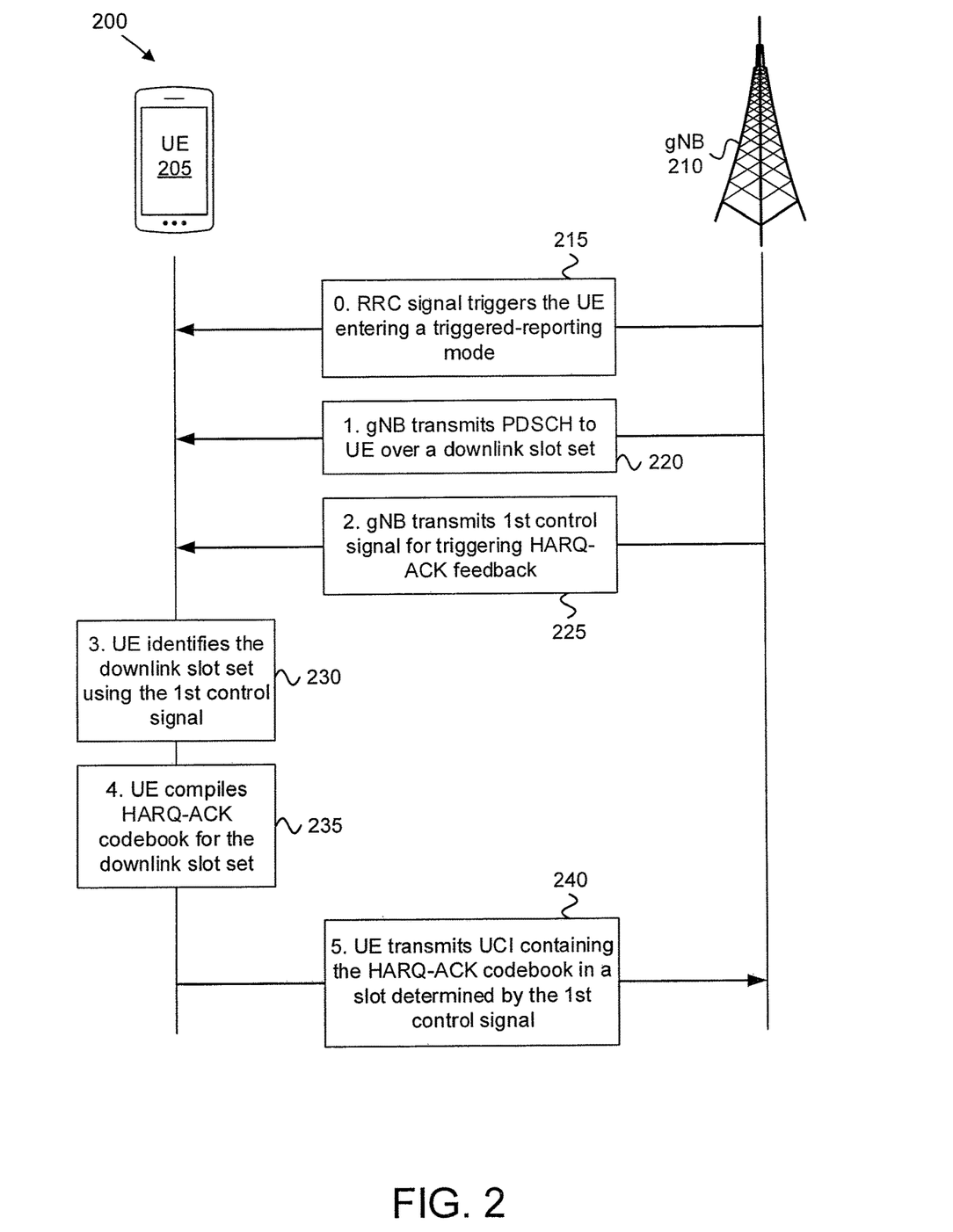
FIG. 2 illustrates one embodiment of a network architecture for triggering HARQ-ACK feedback for a downlink slot set.

FIG. 2 depicts a network procedure 200 used for triggering HARQ-ACK feedback for a downlink slot set, according to embodiments of the disclosure. The network procedure 200 includes a UE 205 and a gNB 210. The network procedure 200 depicts a simplified embodiment of the wireless communication system 100. The UE 205 may be one embodiment of the remote unit 105, while the gNB 210 may be one embodiment of the base unit 110. Here, the gNB 210 may be a gNB or 5G base station. Although only one UE 205 is depicted, in other embodiments the gNB 210 may serve a plurality of UEs 205.

In certain embodiments, the gNB 210 sends RRC signaling to the UE 205 which causes the UE 205 to enter into a triggered-reporting mode (see signaling 215). While in the triggered-reporting mode, the UE 205 only sends its HARQ-ACK feedback to the gNB 210 in response to a trigger, such as a UCI transmission request sent by the gNB 210.

As depicted, the gNB 210 transmits multiple PDSCHs to the UE 205 over a downlink slot set (see signaling 220). This downlink slot set contains multiple downlink transmissions (e.g., PDSCH) subject to HARQ-ACK reporting. The multiple downlink transmissions are sent over multiple slots, multiple mini-slots, a combination of slots and mini-slots, and/or over multiple carriers. As discussed above, the UE 205 transmits its HARQ-ACK feedback for the downlink slot set on a single UCI.

After completion of multiple PDSCH transmission in one downlink slot set, the gNB 210 transmits a first control signal to the UE 205, the first control signal triggering HARQ-ACK feedback for the downlink slot set (see signaling 225). In certain embodiments, the first control signal is sent at the end of the downlink slot set. In other embodiments, the first control signal is sent after the downlink slot set ends.

In some embodiments, the first control signal is a specific UL grant to trigger the UE 205 to report its HARQ-ACK feedback corresponding to the multiple PDSCHs in the downlink slot set (e.g., by transmitting UCI). In one embodiment, a flag indicating a UCI transmission request is included in the specific UL grant to trigger the HARQ-ACK reporting. Here, the flag is used to differentiate the specific UL grant for UCI transmission from a traditional UL grant for UL (e.g., PUSCH) data transmission. In another embodiment, the UE 205 is configured (via RRC signaling) with a new RNTI for reception of the specific UL grant for UCI transmission request. Here, the specific UL grant for UCI transmission request is differentiated to traditional UL grant for UL data transmission by using a different RNTI (e.g., to decode the PUCCH). Here, the new RNTI may be used exclusively for UCI transmission requests.

In another embodiment, the first control signal is a DL grant to trigger the UE 205 to report its HARQ-ACK feedback corresponding to the multiple PDSCHs in the downlink slot set. A flag indicating a UCI transmission request is included in the DL grant to trigger the HARQ-ACK reporting. Here, the flag is used to differentiate the DL grant for UCI transmission from a traditional DL grant for DL (e.g., PDSCH) data transmission. Alternatively, the first control signal may be a group common physical downlink control channel (e.g., PDCCH) to trigger multiple UEs to report HARQ-ACK feedback corresponding to the multiple PDSCHs in the downlink slot set.

In some embodiments, the specific UL grant for UCI transmission request has same payload size as a traditional UL grant for UL data transmission. Beneficially, having the same payload size does not add extra blind detection effort for the UE 205. In other embodiments, the specific UL grant for UCI transmission may have a different payload size than the traditional UL grant for UL data transmission. Here, zero bits may be used to pad the specific UL grant for UCI transmission.

In certain embodiments, the specific UL grant includes a UCI transmission request flag for differentiating traditional UL grant for UL data transmission (as discussed above, this flag may be omitted where a dedicated RNTI is used for reception of the specific UL grant for UCI transmission). The specific UL grant may also indicate a HARQ-ACK codebook size (e.g., to indicate how many bits should be transmitted corresponding to the downlink slot set). In some embodiments, the specific UL grant also indicates one or more of: a scheduled carrier index (i.e., a carrier index field) for the UCI transmission so that UCI can be dynamically scheduled in the most appropriate carrier, a timing offset between the slot where the UL grant is received and the slot where the HARQ-ACK is transmitted (if the HARQ-ACK reporting can be transmitted in same slot with the specific UL grant, then this field is not needed), a resource in the time domain (e.g., the starting symbol in the targeting slot and duration in terms of symbols) or in the frequency domain for transmitting the UCI, a polar coding rate for HARQ-ACK encoding (e.g., if multiple coding rates are supported for UCI transmission), a PUCCH format indication (e.g., long PUCCH format or short PUCCH format), and power control related parameters (e.g., absolute transmit power adjustment).

After receiving the first control signal, the UE 205 identifies the downlink slot set using the first control signal (see block 230). In certain embodiments, the first control signal indicates a starting slot index for the downlink slot set, an ending slot index for the downlink slot set, and/or the size of the downlink slot set. In certain embodiments, the downlink slot set ends at the slot in which the first control signal is received or a specific number of slots prior to the slot in which the first control signal is received. For example, the specific number may be fixed in a technical specification or may be configured via RRC signaling. Determining the downlink slot set is discussed in further detail below with reference to FIGS. 5-7.

After identifying the downlink slot set, the UE 205 compiles a HARQ-ACK codebook for the downlink slot set (see block 235). Here, the HARQ-ACK codebook indicates whether or not the multiple downlink transmissions in the downlink slot set were successfully received and decoded. The UE 205 then transmits UCI containing the HARQ-ACK codebook in a slot determined by the first control signal (see signaling 240). The network procedure 200 ends.

Figure 3:
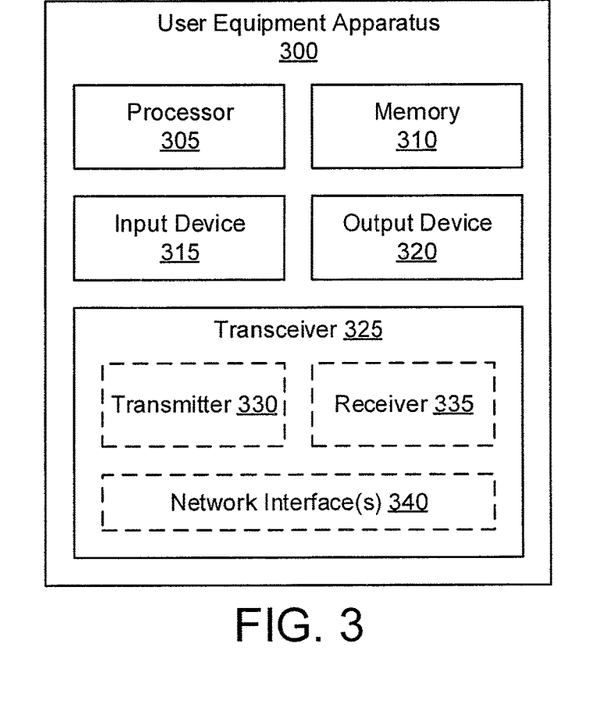
FIG. 3 is a schematic block diagram illustrating one embodiment of a user equipment apparatus for triggering HARQ-ACK feedback for a downlink slot set.

FIG. 3 depicts one embodiment of a user equipment apparatus 300 that may be used for triggering HARQ-ACK feedback for a downlink slot set, according to embodiments of the disclosure. The user equipment apparatus 300 may be one embodiment of the remote unit 105 and/or the UE 205, described above. Furthermore, the user equipment apparatus 300 may include a processor 305, a memory 310, an input device 315, an output device 320, a transceiver 325 for communicating with one or more base units 110.

As depicted, the transceiver 325 may include a transmitter 330 and a receiver 335. The transceiver 325 may also support one or more network interfaces 340, such as the Uu interface used to communicate with a gNB. In some embodiments, the input device 315 and the output device 320 are combined into a single device, such as a touchscreen. In certain embodiments, the user equipment apparatus 300 may not include any input device 315 and/or output device 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In some embodiments, the processor 305 controls the receiver 335 to receive a first control signal from a base unit for triggering HARQ-ACK feedback for a downlink slot set. Here, the downlink slot set comprises multiple downlink slots and the HARQ-ACK feedback for the downlink slot set corresponds to all downlink transmissions in the downlink slot set and is to be transmitted in one UCI. Additionally, the processor 305 identifies the downlink slot set in response to the first control signal and controls the transmitter 330 to transmit UCI to the base unit in a slot determined by the first control signal, the UCI containing the HARQ-ACK feedback for the identified downlink slot set.

In some embodiments, the receiver 335 also receives a RRC signal to enter a triggered reporting mode, which the processor 305 enters. While in the triggered reporting mode the processor 305 does not transmit HARQ-ACK feedback to the base unit until a UCI transmission request is received from the base unit. In such embodiments, the first control signal received from the base unit contains a UCI transmission request. In certain embodiments, the first control signal is an uplink grant. Here, the uplink grant includes a flag to indicate the UCI transmission request. In one embodiment, the UCI transmission request flag is one bit in the uplink grant. Accordingly, the processor 305 identifies the UCI transmission request in the first control signal.

In some embodiments, the first control signal is an uplink grant for UCI transmission. In certain embodiments, the user equipment apparatus 300 is assigned a dedicated RNTI for signaling UCI transmission. For example, the processor 305 may identify an uplink grant for data transmission using a first RNTI and identify an uplink grant for UCI transmission using the dedicated RNTI. Where the processor 305 identifies the uplink grant for UCI transmission using a dedicated RNTI, the uplink grant does not need to include a flag indicating a UCI transmission request. More specifically, in such a scenario the flag for indicating a UCI transmission request becomes redundant as the uplink grant is detected using the dedicated RNTI.

In certain embodiments, the first control signal indicates one or more of: a HARQ-ACK codebook size, a timing offset for UCI transmission, a UCI transmission resource in the time domain, a UCI transmission resource in the frequency domain, a Polar coding rate for UCI encoding, and a UCI transmission format. In certain embodiments, the first control signal points to a carrier index which designates a scheduled carrier for the UCI transmission. Accordingly, the processor 305 may formulate the HARQ-ACK feedback and/or formulate the UCI in a manner indicated by the first control signal.

As discussed above, the downlink slot set includes multiple downlink transmissions. The downlink slot set may include multiple PDSCH transmissions on multiple slots, multiple PDSCH transmissions on multiple mini-slots, multiple PDSCH transmissions on a mix of slots and mini-slots, and/or multiple PDSCH transmissions on multiple carriers (e.g., carrier aggregation). In certain embodiments, the first control signal defines the downlink slot set. For example, the first control signal may indicate one or more of: a starting slot index for the downlink slot set, an ending slot index for the downlink slot set, and a number of slots of the downlink slot set. Here, the processor 305 identifies the downlink slot set for HARQ-ACK feedback using the indication in the first control signal.

In one embodiment, the downlink slot set ends at a slot where the first control signal is received. In another embodiment, the downlink slot set may end a specific number of slots prior to a slot where the first control signal is received. The specific number may be fixed in the technical specification, may be configured by RRC signaling, and the like. In further embodiments, the receiver 335 receives a RRC signal for configuring a maximum number of slots in the downlink slot set. Here, the first control signal is received in the last slot of the downlink slot set.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data relating to triggering HARQ-ACK feedback for a downlink slot set. For example, the memory 310 may store HARQ-ACK feedback, downlink slot size and placement information, and the like. In some embodiments, the memory 310 also stores program code and related data, such as an operating system or other controller algorithms operating on the remote unit 105 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes two or more different devices, such as a keyboard and a touch panel. In certain embodiments, the input device 315 may include a camera for capturing images or otherwise inputting visual data.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

The transceiver 325 communicates with base units 110 of a mobile communication network. The transceiver 325 may include one or more transmitters 330 and one or more receivers 335. As discussed above, the transceiver 325 may support one or more the network interface 340 for communicating with the base unit 110.

Figure 4:
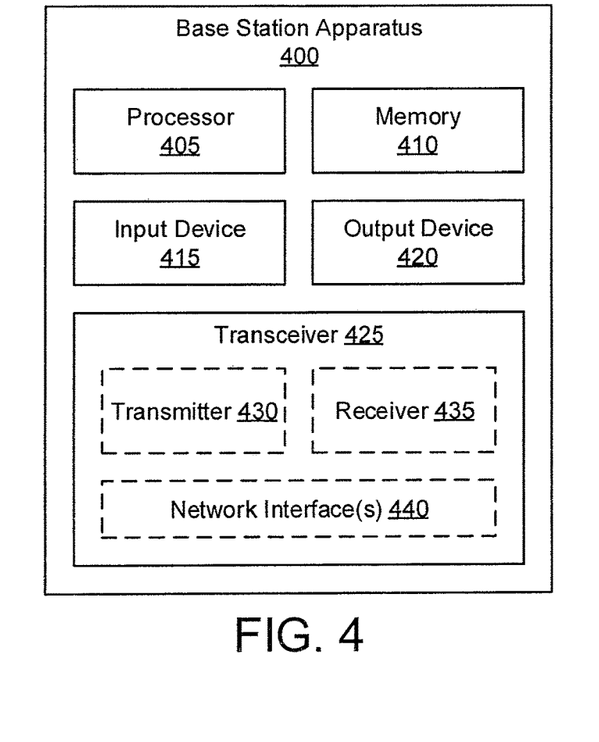
FIG. 4 is a schematic block diagram illustrating another embodiment of a base station apparatus for triggering HARQ-ACK feedback for a downlink slot set.

FIG. 4 depicts one embodiment of a base station apparatus 400 that may be used for triggering HARQ-ACK feedback for a downlink slot set, according to embodiments of the disclosure. The base station apparatus 400 may be one embodiment of the base unit 110 and/or gNB 210, described above. Furthermore, the base station apparatus 400 may include a processor 405, a memory 410, an input device 415, an output device 420, a transceiver 425 for communicating with one or more remote units 105 and/or a mobile core network 130.

As depicted, the transceiver 425 may include a transmitter 430 and a receiver 435. The transceiver 425 may also support one or more network interfaces 440, such as the Uu interface, N2 interface, N3 interface, and/or other network interfaces suitable for communication with a remote unit and/or core network. In some embodiments, the input device 415 and the output device 420 are combined into a single device, such as a touchscreen. In certain embodiments, the base station apparatus 400 may not include any input device 415 and/or output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In some embodiments, the processor 405 controls the transmitter 430 to transmit a first control signal to a remote unit (such as the UE 205), the first control signal triggering HARQ-ACK feedback for a downlink slot set. Here, the downlink slot set comprises multiple downlink slots and the HARQ-ACK feedback for the downlink slot set corresponds to all downlink transmissions in the downlink slot set and is to be transmitted (by the remote unit) in one UCI. Additionally, the processor 405 controls the receiver 435 to receive UCI from the remote unit in a slot determined by the first control signal, the UCI containing the HARQ-ACK feedback for the identified downlink slot set.

In some embodiments, the transmitter 430 also transmits a RRC signal causing the remote unit to enter a triggered reporting mode. While in the triggered reporting mode, the remote unit does not transmit HARQ-ACK feedback to the base station apparatus 400 until the remote unit receives a UCI transmission request. In such embodiments, the first control signal transmitted to the remote unit contains a UCI transmission request. In certain embodiments, the first control signal is an uplink grant. Here, the uplink grant may include a flag to indicate the UCI transmission request (e.g., to distinguish from an uplink grant for data transmission). In one embodiment, the UCI transmission request flag is one bit in the uplink grant.

In some embodiments, the first control signal is an uplink grant for UCI transmission. In certain embodiments, the processor 405 configures the remote unit with a dedicated RNTI for signaling UCI transmission. For example, the remote unit may identify an uplink grant for data transmission using a first RNTI and identify an uplink grant for UCI transmission using the dedicated RNTI. Where the remote unit identifies the uplink grant for UCI transmission using a dedicated RNTI, the uplink grant does not need to include a flag indicating a UCI transmission request. More specifically, in such a scenario the flag for indicating a UCI transmission request becomes redundant as the remote unit detects the uplink grant for UCI transmission using the dedicated RNTI.

In certain embodiments, the first control signal indicates one or more of: a HARQ-ACK codebook size, a timing offset for UCI transmission, a UCI transmission resource in the time domain, a UCI transmission resource in the frequency domain, a Polar coding rate for UCI encoding, and a UCI transmission format. In certain embodiments, the first control signal points to a carrier index which designates a scheduled carrier for the UCI transmission.

As discussed above, the downlink slot set includes multiple downlink transmissions. The downlink slot set may include multiple PDSCH transmissions on multiple slots, multiple PDSCH transmissions on multiple mini-slots, multiple PDSCH transmissions on a mix of slots and mini-slots, and/or multiple PDSCH transmissions on multiple carriers (e.g., carrier aggregation). In certain embodiments, the first control signal defines the downlink slot set. For example, the first control signal may indicate one or more of: a starting slot index for the downlink slot set, an ending slot index for the downlink slot set, and a number of slots of the downlink slot set. Here, the processor 405 defines the downlink slot set for HARQ-ACK feedback using the indication in the first control signal.

In one embodiment, the downlink slot set ends at a slot where the first control signal is transmitted. In another embodiment, the downlink slot set may end a specific number of slots prior to a slot where the first control signal is transmitted. The specific number may be fixed in the technical specification, may be configured by RRC signaling, and the like. In further embodiments, the transmitter 430 transmits a RRC signal for configuring a maximum number of slots in the downlink slot set. Here, the first control signal is transmitted in the last slot of the downlink slot set.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to triggering HARQ-ACK feedback for a downlink slot set. For example, the memory 410 may store HARQ-ACK feedback, downlink slot size and placement information, and the like. In some embodiments, the memory 410 also stores program code and related data, such as an operating system or other controller algorithms operating on the remote unit 105 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes two or more different devices, such as a keyboard and a touch panel. In certain embodiments, the input device 415 may include a camera for capturing images or otherwise inputting visual data.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 communicates with remote unit within a mobile communication network. The transceiver 425 may also communicate with a core network, such as the mobile core network 130. The transceiver 425 may include one or more transmitters 430 and one or more receivers 435. As discussed above, the transceiver 425 may supports one or more the network interface 440 for communicating with remote units 105 and the mobile core network 130.

Figure 5:
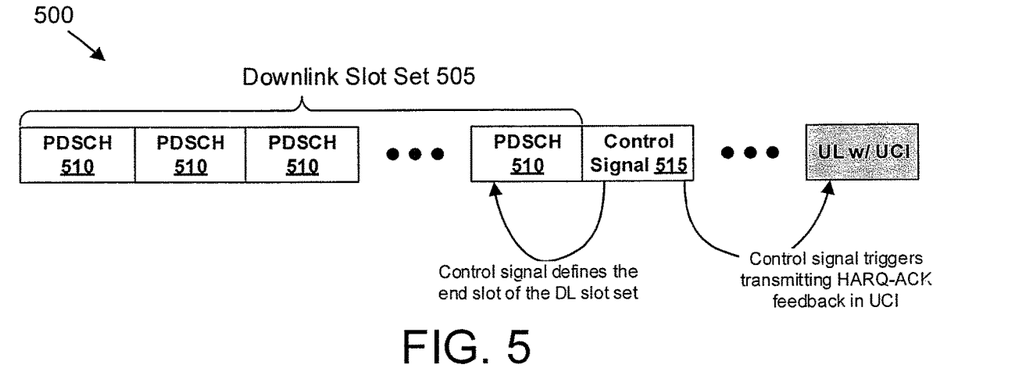
FIG. 5 is a block diagram illustrating one embodiment of identifying a downlink slot set using a control signal for triggering HARQ-ACK feedback for the downlink slot set.
Figure 6:
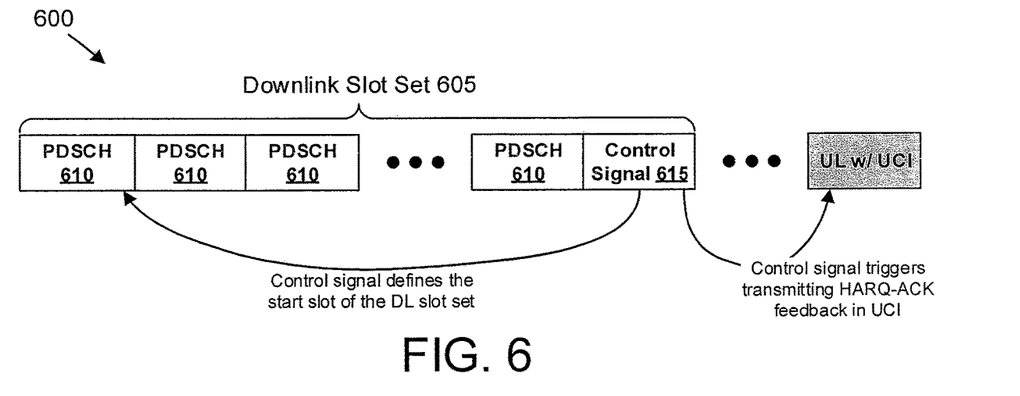
FIG. 6 is a block diagram illustrating another embodiment of identifying a downlink slot set using a control signal for triggering HARQ-ACK feedback for the downlink slot set.
Figure 7:
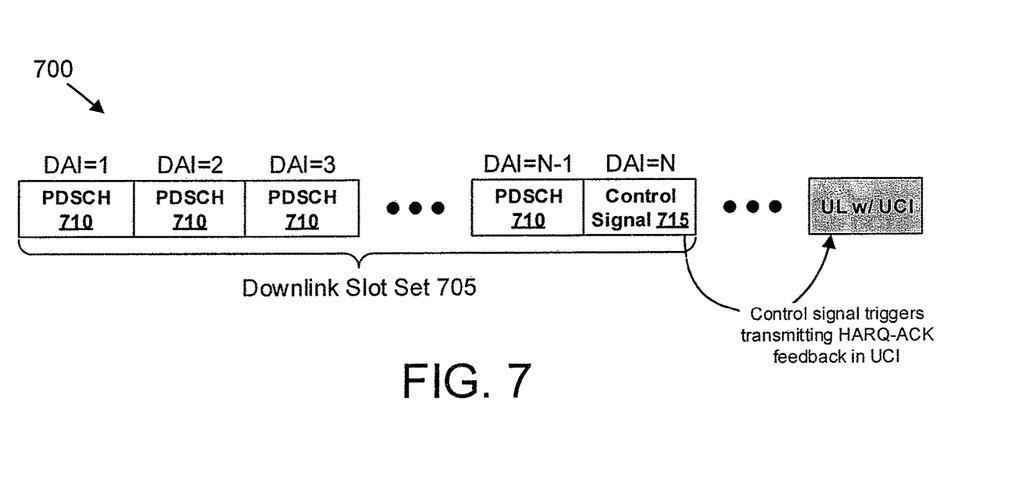
FIG. 7 is a block diagram illustrating a third embodiment of identifying a downlink slot set using a control signal for triggering HARQ-ACK feedback for the downlink slot set.

FIGS. 5-7 depicts various embodiments of determining the downlink slot set using the first control signal. FIG. 5 depicts a first downlink slot set 505 with multiple slots containing PDSCHs 510. In the depicted embodiment, the first downlink slot set 505 ends prior to a slot containing the control signal 515 for triggering HARQ-ACK feedback for the first downlink slot set 505. However, in other embodiments, the first downlink slot set 505 may also include the slot containing the control signal 515.

Here, the control signal 515 defines the end slot of the first downlink slot set 505. In some embodiments, the control signal 515 indicates the slot index of the end slot. In one embodiment, the control signal 515 includes a specific uplink grant that indicates the ending slot index for the first downlink slot set 505. In another embodiment, the control signal 515 includes a specific uplink grant that indicates the ending slot index for the first downlink slot set 505 as well as the number of slots in the first downlink slot set 505 (e.g., a set size).

In certain embodiments, the end slot of the first downlink slot set 505 is implicitly signaled by the slot position of the control signal 515, thus eliminating the need to include an end slot index in the control signal 515. In one embodiment, the UE 205 may be configured (or the network may be predefined) to recognize the slot immediately before the slot where the control signal 515 is placed as being the end of a downlink slot set, as depicted in FIG. 5. In another embodiment, the UE 205 may recognize the slot where the control signal 515 is placed as being the end of a downlink slot set.

Where the end slot is implicitly signaled, the control signal 515 may indicate the set size for the first downlink slot set 505. Alternatively, the set size for the first downlink slot set 505 may be semi-statically configured via RRC signaling. As an example, where the set size is T, if the control signal 515 is received in slot n and defines the end slot of the first downlink slot set 505 (e.g., where the location of the control signal defines the end of the downlink slot set), then the slot location of the control signal 515 implies that the first downlink slot set 505 starts at n-T and ends at slot n.

In certain embodiments, the UE 205 recognizes the end of a downlink slot set as a slot having an offset before the slot where the control signal 515 is placed. For example, if the offset value is x and the control signal 515 is located in slot n, then the end slot for the first downlink slot set 505 is the slot n-x. The slot offset may be configured by the gNB 210 via RRC signaling or may be dynamically indicated in the control signal 515. A larger offset allows the UE 205 more processing time to decode the PDSCHs 610 and prepare HARQ-ACK feedback.

In some embodiments, a maximum slot set size is configured by the gNB 210 via RRC signaling. Here, the control signal 515 containing a specific uplink grant may be transmitted in any slot within the downlink slot set, e.g., dependent on gNB implementation. Alternatively, the specific uplink grant may be transmitted in the last slot of the downlink slot set. The UE 205, upon receiving the control signal 515, determines the end of the first downlink slot set 505 to be the slot where the specific uplink grant is received.

As discussed above, the control signal 515 triggers transmission of UCI containing HARQ-ACK feedback for the first downlink slot set 505. In certain embodiments, the control signal 515 includes a specific uplink grant scheduling the UCI transmission. In certain embodiments, the UE 205 uses information in the control signal 515 to identify the slot for transmitting the UCI.

FIG. 6 depicts a second downlink slot set 605 with multiple slots containing PDSCHs 610. In the depicted embodiment, the second downlink slot set 605 also includes the slot containing the control signal 615 for triggering HARQ-ACK feedback for the second downlink slot set 605. However, in other embodiments, the second downlink slot set 605 may end prior to a slot containing the control signal 615.

Here, the control signal 615 defines the starting slot of the second downlink slot set 605. In one embodiment, the control signal 615 includes a specific uplink grant that indicates the starting slot index for the second downlink slot set 605. In another embodiment, the control signal 615 includes a specific uplink grant that indicates the starting slot index for the second downlink slot set 605 as well as the number of slots in the second downlink slot set 605 (e.g., a set size). In another embodiment, the set size for the second downlink slot set 605 may be semi-statically configured via RRC signaling. As an example, where the set size is T, if the control signal 615 is received in slot n and defines the end slot of the second downlink slot set 605 (e.g., where the location of the control signal defines the end of the downlink slot set), then the slot location of the control signal 615 implies that the second downlink slot set 605 starts at n-T and ends at slot n.

As discussed above, the control signal 615 triggers transmission of UCI containing HARQ-ACK feedback for the second downlink slot set 605. In certain embodiments, the control signal 615 includes a specific uplink grant scheduling the UCI transmission. In certain embodiments, the UE 205 uses information in the control signal 615 to identify the slot for transmitting the UCI.

FIG. 7 depicts a third downlink slot set 705 with multiple slots containing PDSCHs 710. In the depicted embodiment, the third downlink slot set 705 ends prior to a slot containing the control signal 715 for triggering HARQ-ACK feedback for the third downlink slot set 705. However, in other embodiments, the third downlink slot set 705 may also include the slot containing the control signal 715.

Here, the UE 205 uses DAI values corresponding to the PDSCH 710 to identify a starting slot of the third downlink slot set 705. In the depicted example, the PDSCH 710 with the DAI value of "1" in the associated PDCCH is the starting slot of the third downlink slot set 705. In one embodiment, the control signal 715 indicates a set size or an ending slot index for the third downlink slot set 705. In another embodiment, the slot location of the control signal 715 defines the end of the third downlink slot set 705. In other embodiments, the size of the third downlink slot set 705 may be already known to the UE 205, for example via RRC signaling of the set size or maximum downlink slot set size.

As discussed above, the control signal 715 triggers transmission of UCI containing HARQ-ACK feedback for the third downlink slot set 705. In certain embodiments, the control signal 715 includes a specific uplink grant scheduling the UCI transmission. In certain embodiments, the UE 205 uses information in the control signal 715 to identify the slot for transmitting the UCI.

Figure 8:
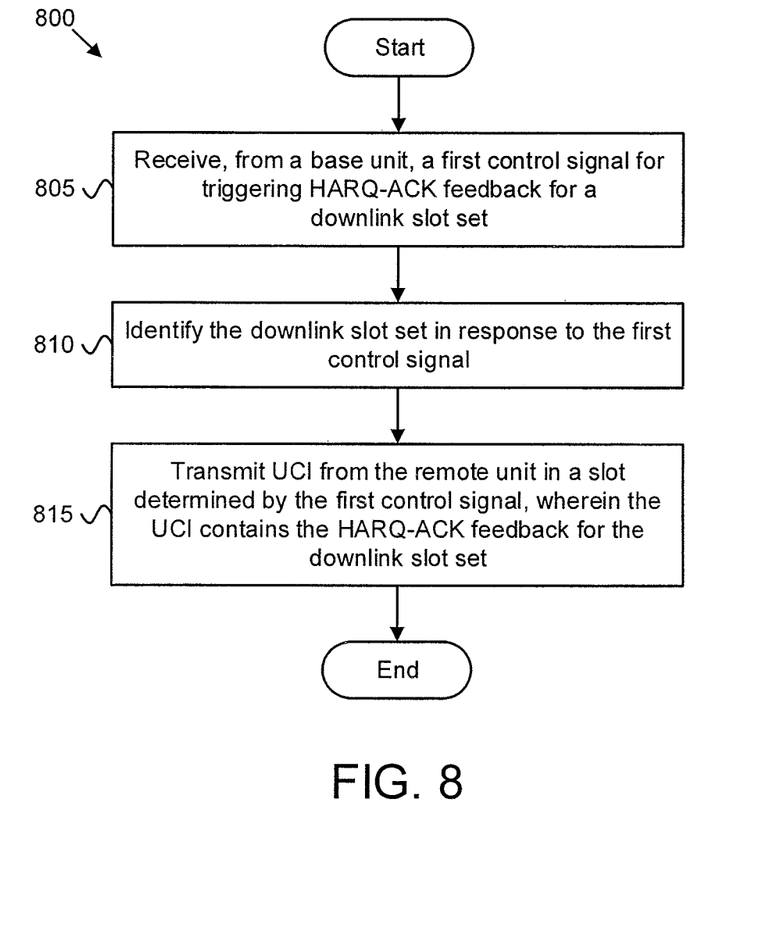
FIG. 8 is a schematic flow chart diagram illustrating one embodiment of a method for triggering HARQ-ACK feedback for a downlink slot set.

FIG. 8 is a schematic flow chart diagram illustrating one embodiment of a method 800 for triggering HARQ-ACK feedback for a downlink slot set, according to embodiments of the disclosure. In some embodiments, the method 800 is performed by a remote unit, such as the remote unit 105, the UE 205, and/or the user equipment apparatus 300. In certain embodiments, the method 800 may be performed by a processor executing program code, for example, a microcontroller, a microprocessor, a CPU, a GPU, an auxiliary processing unit, a FPGA, or the like.

The method 800 begins and receives 805, from a base unit, a first control signal for triggering HARQ-ACK feedback for a downlink slot set. Here, the downlink slot set includes multiple downlink slots. Moreover, the HARQ-ACK feedback for the downlink slot set corresponds to all downlink transmissions in the downlink slot set.

In certain embodiments, the remote unit enters a triggered reporting mode in response to receiving a RRC signal from the base unit. While the remote unit is in the triggered reporting mode, HARQ-ACK feedback is only transmitted to the base unit in response to receiving a UCI transmission request. In such embodiments, receiving 805 the first control signal for triggering HARQ-ACK feedback includes receiving a UCI transmission request in the first control signal. In further embodiments, the first control signal is an uplink grant that includes a flag to indicate the UCI transmission request. In further embodiments, the first control signal is a downlink grant that includes a flag to indicate the UCI transmission request. In further embodiments, the first control signal is a group common PDCCH to trigger multiple UEs to report HARQ-ACK feedback for a downlink slot set.

In some embodiments, receiving 805 the first control signal for triggering HARQ-ACK feedback includes receiving an uplink grant for UCI transmission using a dedicated RNTI. Here, the remote unit is configured with the dedicated RNTI used to detect an uplink grant for UCI transmission, the dedicated RNTI being separate from a RNTI used to detect an uplink grant for data transmission. In certain embodiments, the first control signal indicates one or more of: a HARQ-ACK codebook size, a timing offset for UCI transmission, a UCI transmission resource in the time domain, a UCI transmission resource in the frequency domain, a Polar coding rate for UCI encoding, and a UCI transmission format. In certain embodiments, the first control signal points to a carrier index which designates a scheduled carrier for the UCI transmission.

The method 800 includes identifying 810 the downlink slot set in response to the first control signal. In certain embodiments, the first control signal indicates one or more of: a starting slot index for the downlink slot set, an ending slot index for the downlink slot set, and a number of slots of the downlink slot set. Accordingly, identifying 810 the downlink slot set includes identifying the downlink slot set for HARQ-ACK feedback using the indication. The downlink slot set may include multiple PDSCH transmissions on multiple slots, multiple PDSCH transmissions on multiple mini-slots, multiple PDSCH transmissions on a mix of slots and mini-slots, and/or multiple PDSCH transmissions on multiple carriers (e.g., carrier aggregation).

In certain embodiments, the downlink slot set ends a specific number of slots prior to a slot where the first control signal is received. In other embodiments, the downlink slot set ends at a slot where the first control signal is received. In further embodiments, identifying 810 the downlink slot set includes receiving an RRC signal for configuring a maximum number of slots of the downlink slot set, wherein the first control signal is received in the last slot of the downlink slot set.

The method 800 includes transmitting 815 UCI to the base unit in a slot determined using the first control signal. Here, the UCI contains the HARQ-ACK feedback for the identified downlink slot set. Note that the HARQ-ACK feedback for all downlink transmissions in the downlink slot set is transmitted in one UCI. The method 800 ends.

Figure 9:
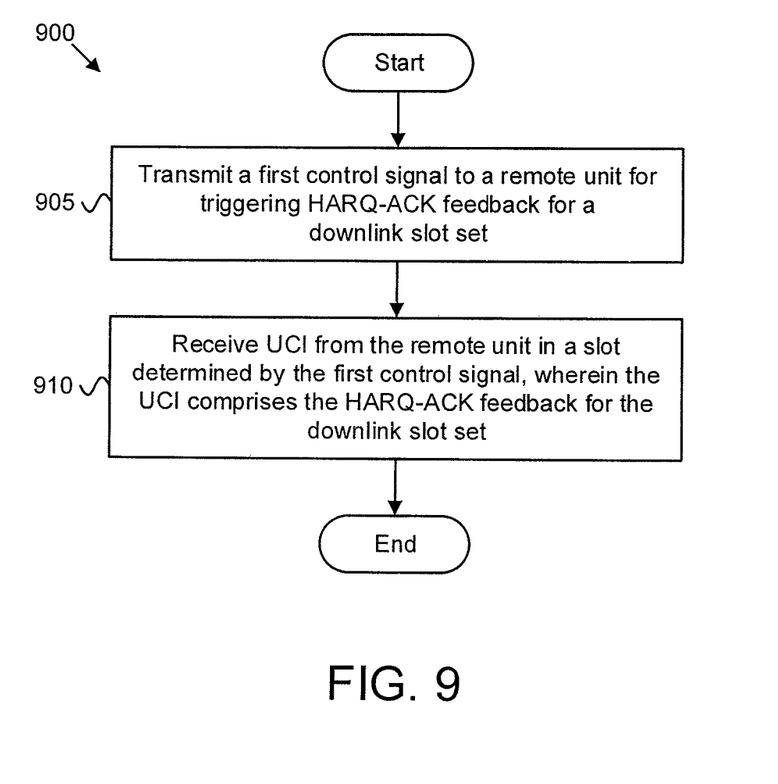
FIG. 9 is a schematic flow chart diagram illustrating another embodiment of a method for triggering HARQ-ACK feedback for a downlink slot set.

FIG. 9 is a schematic flow chart diagram illustrating one embodiment of a method 900 for triggering HARQ-ACK feedback for a downlink slot set, according to embodiments of the disclosure. In some embodiments, the method 900 is performed by a base unit, such as the base unit 110, the gNB 210, and or the base station apparatus 400. In certain embodiments, the method 900 may be performed by a processor executing program code, for example, a microcontroller, a microprocessor, a CPU, a GPU, an auxiliary processing unit, a FPGA, or the like.

The method 900 begins and transmits 905, to a remote unit, a first control signal for triggering HARQ-ACK feedback for a downlink slot set. Here, the downlink slot set includes multiple downlink slots. Moreover, the HARQ-ACK feedback for the downlink slot set corresponds to all downlink transmissions in the downlink slot set.

In certain embodiments, the remote unit is in a triggered reporting mode (e.g., the remote unit may enter the triggered reporting mode in response to receiving a RRC signal from the base unit). While the remote unit is in the triggered reporting mode, HARQ-ACK feedback is only transmitted to the base unit in response to receiving a UCI transmission request. In such embodiments, transmitting 905 the first control signal for triggering HARQ-ACK feedback includes transmitting a UCI transmission request in the first control signal. In further embodiments, the first control signal is an uplink grant that includes a flag to indicate the UCI transmission request. In further embodiments, the first control signal is a downlink grant that includes a flag to indicate the UCI transmission request. In further embodiments, the first control signal is a group common PDCCH to trigger multiple UEs to report HARQ-ACK feedback for a downlink slot set.

In some embodiments, transmitting 905 the first control signal for triggering HARQ-ACK feedback includes transmitting an uplink grant for UCI transmission using a dedicated RNTI. Here, the remote unit is configured with the dedicated RNTI used to detect an uplink grant for UCI transmission, the dedicated RNTI being separate from a RNTI used to detect an uplink grant for data transmission. In certain embodiments, the first control signal indicates one or more of: a HARQ-ACK codebook size, a timing offset for UCI transmission, a UCI transmission resource in the time domain, a UCI transmission resource in the frequency domain, a Polar coding rate for UCI encoding, and a UCI transmission format. In certain embodiments, the first control signal points to a carrier index which designates a scheduled carrier for the UCI transmission.

The method 900 includes receiving 910 UCI from the remote unit in a slot determined using the first control signal. Here, the UCI contains the HARQ-ACK feedback for the identified downlink slot set. Note that the HARQ-ACK feedback for all downlink transmissions in the downlink slot set is transmitted in one UCI. The method 900 ends.

In certain embodiments, the first control signal indicates one or more of: a starting slot index for the downlink slot set, an ending slot index for the downlink slot set, and a number of slots of the downlink slot set. The downlink slot set may include multiple PDSCH transmissions on multiple slots, multiple PDSCH transmissions on multiple mini-slots, multiple PDSCH transmissions on a mix of slots and mini-slots, and/or multiple PDSCH transmissions on multiple carriers (e.g., carrier aggregation).

In certain embodiments, the downlink slot set ends a specific number of slots prior to a slot where the first control signal is transmitted. In other embodiments, the downlink slot set ends at a slot where the first control signal is transmitted. In further embodiments, the remote unit may be configured (e.g., the RRC signaling) with a maximum number of slots of the downlink slot set, wherein the first control signal is transmitted in the last slot of the downlink slot set.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a receiver that receives a first control signal from a base unit for triggering hybrid automatic repeat request acknowledgement (HARQ-ACK) feedback for a downlink slot set, wherein the downlink slot set comprises multiple downlink slots and the HARQ-ACK feedback for the downlink slot set corresponds to all downlink transmissions in the downlink slot set and is transmitted in one uplink control information (UCI) and the first control signal indicates one or more of: a starting slot index for the downlink slot set, an ending slot index for the downlink slot set, and a number of slots of the downlink slot set;
   a processor that identifies the downlink slot set in response to the first control signal using the indication received in the first control signal; and
   a transmitter that transmits UCI to the base unit in a slot determined by the first control signal, wherein the UCI comprises the HARQ-ACK feedback for the identified downlink slot set.

2. The apparatus of claim 1, wherein the receiver also receives a radio resource control (RRC) signal and the processor enters a triggered reporting mode, wherein the apparatus does not transmit HARQ-ACK feedback until an UCI transmission request is received, wherein the first control signal contains an UCI transmission request.

3. The apparatus of claim 2, wherein the first control signal is an uplink grant that includes a flag to indicate the UCI transmission request.

4. The apparatus of claim 1, wherein the first control signal is an uplink grant for UCI transmission, and wherein the processor detects an uplink grant for data transmission using a first radio network temporary identifier (RNTI) and detects the uplink grant for UCI transmission using a second RNTI.

5. The apparatus of claim 1, wherein the downlink slot set comprises one or more of: multiple PDSCH transmissions on multiple slots, multiple PDSCH transmissions on multiple mini-slots, and multiple PDSCH transmissions on multiple carriers.

6. The apparatus of claim 1, wherein the first control signal indicates one or more of: a HARQ-ACK codebook size, a timing offset for UCI transmission, a UCI transmission resource in time domain, a UCI transmission resource in frequency domain, a Polar coding rate for UCI encoding, and a UCI transmission format.

7. The apparatus of claim 1, wherein the first control signal indicates a carrier index indicating a scheduled carrier for the UCI transmission.

8. The apparatus of claim 1, wherein the downlink slot set ends a determined number of slots prior to a slot where the first control signal is received.

9. The apparatus of claim 1, wherein the downlink slot set ends at a slot where the first control signal is received.

10. The apparatus of claim 1, wherein the receiver further receives a RRC signal for configuring a maximum number of slots of the downlink slot set, wherein the first control signal is received in the last slot of the downlink slot set.

11. A method comprising:
receiving a first control signal from a base unit for triggering hybrid automatic repeat request acknowledgement (HARQ-ACK) feedback for a downlink slot set, wherein the downlink slot set comprises multiple downlink slots and the HARQ-ACK feedback for the downlink slot set corresponds to all downlink transmissions in the downlink slot set and is transmitted in one uplink control information (UCI) and the first control signal indicates one or more of: a starting slot index for the downlink slot set, an ending slot index for the downlink slot set, and a number of slots of the downlink slot set;
identifying the downlink slot set in response to the first control signal using the indication received in the first control signal; and
transmitting UCI to the base unit in a slot determined by the first control signal, wherein the UCI comprises the HARQ-ACK feedback for the identified downlink slot set.

12. The method of claim 11, further comprising receiving a radio resource control (RRC) signal and entering a triggered reporting mode, wherein HARQ-ACK feedback is only transmitted to the base unit, while in the triggered reporting mode, in response to receiving a UCI transmission request, wherein the first control signal contains a UCI transmission request.

13. The method of claim 12, wherein the first control signal is an uplink grant that includes a flag to indicate the UCI transmission request.

14. The method of claim 11, wherein the first control signal is an uplink grant for UCI transmission, the method further comprising detecting an uplink grant for data transmission using a first radio network temporary identifier (RNTI) and detecting the uplink grant for UCI transmission using a second RNTI.

15. The method of claim 11, wherein the downlink slot set comprises one or more of: multiple PDSCH transmissions on multiple slots, multiple PDSCH transmissions on multiple mini-slots, and multiple PDSCH transmissions on multiple carriers.

16. The method of claim 11, wherein the first control signal indicates one or more of: HARQ-ACK codebook size, timing offset for UCI transmission, UCI transmission resource in time domain, UCI transmission resource in frequency domain, Polar coding rate for UCI encoding, UCI transmission format.

17. The method of claim 11, wherein the first control signal indicates a carrier index indicating a scheduled carrier for the UCI transmission.

18. The method of claim 11, wherein the downlink slot set ends a determined number of slots prior to a slot where the first control signal is received.

* * * * *